(12) United States Patent
Lu et al.

(10) Patent No.: US 7,804,571 B2
(45) Date of Patent: *Sep. 28, 2010

(54) VERTICAL ALIGNMENT LIQUID CRYSTAL DISPLAY WITH HIGH TRANSMITTANCE AND WIDE VIEW ANGLE

(75) Inventors: Ruibo Lu, Orlando, FL (US); Qi Hong, Orlando, FL (US); Shin-Tson Wu, Oviedo, FL (US); Thomas X. Wu, Orlando, FL (US)

(73) Assignees: University of Central Florida Research Foundation, Inc., Orlando, FL (US); Toppoly Optoelectronics Corp., Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/286,934

(22) Filed: Oct. 3, 2008

(65) Prior Publication Data

US 2009/0066889 A1 Mar. 12, 2009

Related U.S. Application Data

(62) Division of application No. 11/021,985, filed on Dec. 23, 2004, now Pat. No. 7,466,385.

(51) Int. Cl.
G02F 1/1343 (2006.01)
G02F 1/1337 (2006.01)
(52) U.S. Cl. .................. 349/139; 349/129; 349/130
(58) Field of Classification Search ................ 349/129, 349/130, 139
See application file for complete search history.

(56) References Cited

U.S. PATENT DOCUMENTS

| | | | |
|---|---|---|---|
| 6,285,431 B2 | 9/2001 | Lyu et al. | |
| 6,323,926 B2 | 11/2001 | Watanabe et al. | |
| 6,424,398 B1 | 7/2002 | Taniguchi | |
| 6,570,638 B2 | 5/2003 | Song | |
| 6,894,752 B2* | 5/2005 | Okada et al. | 349/129 |
| 7,466,385 B2* | 12/2008 | Lu et al. | 349/139 |
| 2003/0053020 A1 | 3/2003 | Okada et al. | |
| 2003/0107695 A1 | 6/2003 | Kubo et al. | |
| 2004/0051831 A1 | 3/2004 | Su Yu et al. | |
| 2004/0223104 A1* | 11/2004 | Chang | 349/118 |
| 2005/0128412 A1 | 6/2005 | Lee | |

OTHER PUBLICATIONS

A. Takeda, et al, "A Super-High Image Quality Multi-Domain Vertical Alignment LCD" SID Technical Digest, vol. 29, 1998, p. 1077.

Y. Tanada, et al, "A New Design to improve Performance and Simplify the Manufacturing Process of High-Quality MVA TFT-LCD Panels" SID Technical Disgest, vol. 30, 1999, p. 206.

Yoshio Koike, et al, "Super High Quality MVA-TFT Liquid Crystal Displays" Fujitsu Science Technical Journal, vol. 35, 1999, p. 221.

Kyung Hyun Kim, et la., "PVA Technology for High Performance LCD Monitors" Journal of Information Display, vol. 1, 2000, p. 3.

(Continued)

Primary Examiner—Michael H Caley
(74) Attorney, Agent, or Firm—Brian S. Steinberger; Joyce P. Morlin; Law Offices of Brian S. Steinberger, P.A.

(57) ABSTRACT

Structures, devices, systems and methods of using multi-domain vertical alignment liquid crystal displays with high transmittance, high contrast ratio and wide view angle in which at least one of the electrode substrates has circular or ring-shaped openings, such as holes or slits. Circular or ring-shaped patterns for openings and electrodes have not been used in the construction of a liquid crystal display. The new multi-domain vertical alignment (MDVA) liquid crystal display is particularly suitable for liquid crystal display television and computer monitor applications.

11 Claims, 18 Drawing Sheets

OTHER PUBLICATIONS

Yutaka Ishii, et al., "Invited Paper: High Performance TFT-LCDs for AVC Applications" SID Technical Digest, vol. 32, 2001, p. 1090.

Yuchiro Yamada, et al., "Fast Response and Wide-Viewing Angle Technologies for LC-TV Application" IDW Technical Digest, 2002, p. 203.

S.T. Wu, et al., "Reflective Liquid Crystal Displays" (Wiley, Chichester, 2001), Chap. 12.

A. Takeda et al., A Super-High Image Quality Multi-Domain Vertical Alignment LCD (1998), SID Technical Digest, vol. 29, p. 1077.

Y. Tanaka et al., A New Design to Improve Performance and Simplify the Manufacturing Process of High-Quality MVA TFT-LCD Panels, (1999), SID Technical Digest, vol. 30, p. 206.

Yoshio Koike et al., Super High Quality MVA-TFT Liquid Crystal Displays, (1999), Fujitsu Science Technical Journal, vol. 35, p. 221.

Kyung Hyun Kim et al., PVA Technology for High Performance LCD Monitors, (2000), Journal of Information Display, vol. 1, p. 3.

Yutaka Ishii et al., Invited Paper: High Performance TFT-LCDs for AVC Applications, (2001), SID Technical Digest, vol. 32, p. 1090.

Yuichiro Yamada et al., Fast Response and Wide-Viewing Angle Technologies for LC-TV Application, (2002), IDW Technical Digest, p. 203.

S.T. Wu and D.K. Yang, Reflective Liquid Crystal Displays (Wiley, Chichester, 2001), Chap. 12.

\* cited by examiner

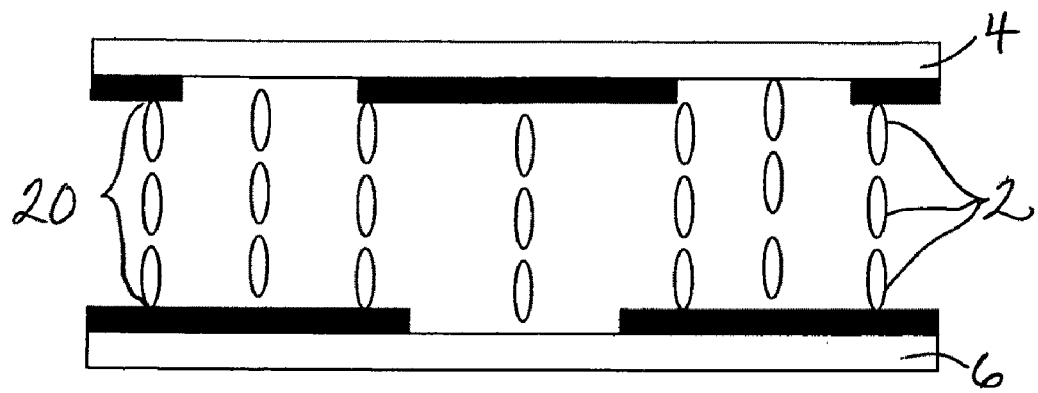
Fig. 2A
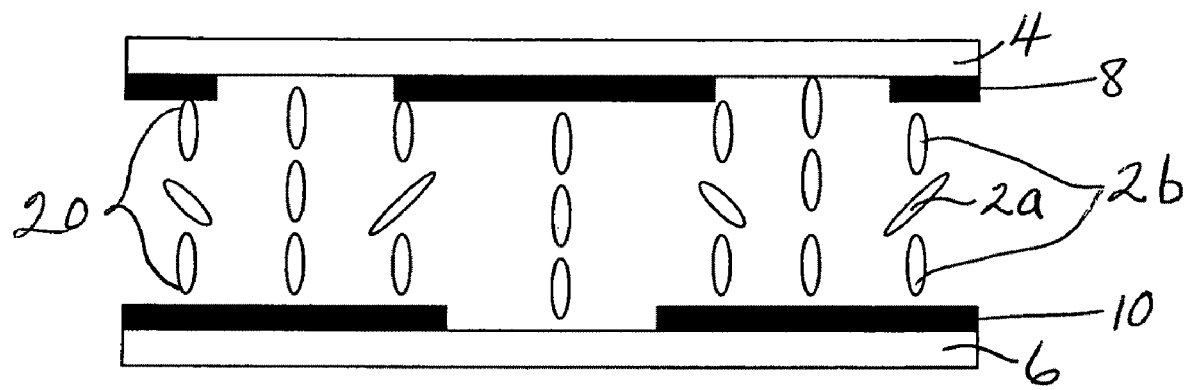
Fig. 2B
Fig. 2
(PRIOR ART)

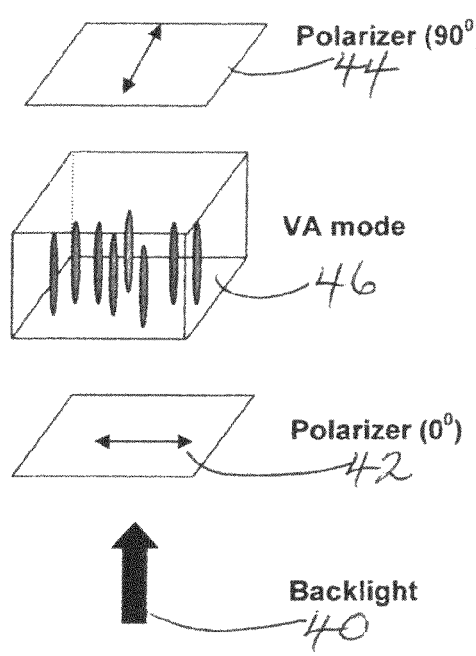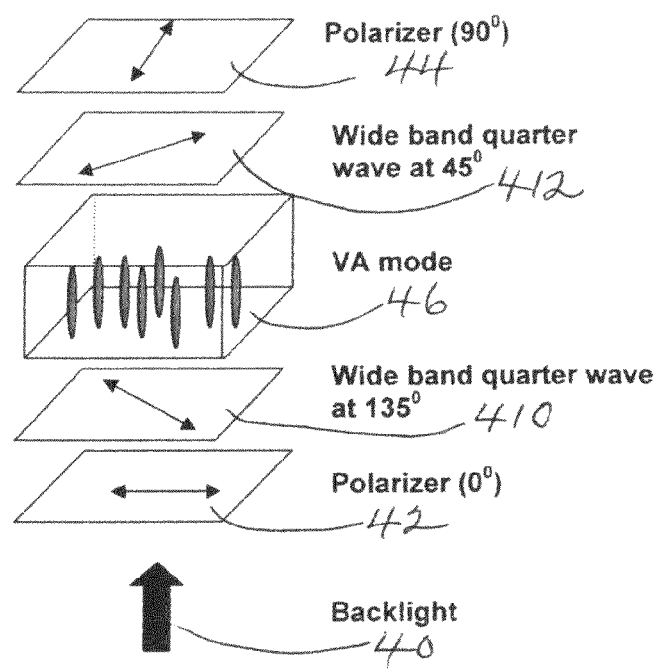
Fig. 4.

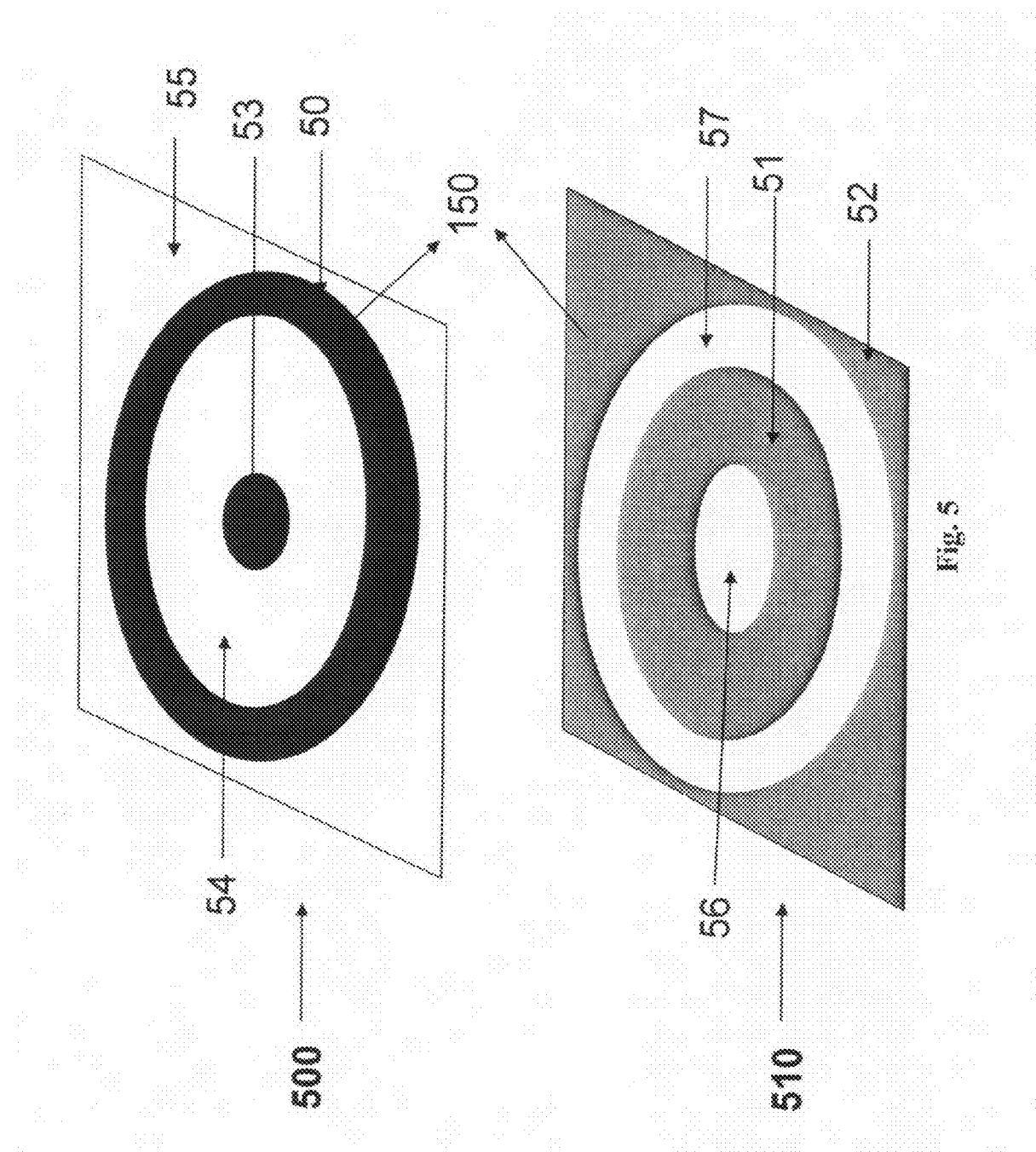

VERTICAL ALIGNMENT LIQUID CRYSTAL DISPLAY WITH HIGH TRANSMITTANCE AND WIDE VIEW ANGLE

This is a Divisional of application Ser. No. 11/021,985 filed Dec. 23, 2004, now U.S. Pat. No. 7,466,385.

This invention relates to a novel structure of vertical alignment liquid crystal displays, and more specifically to structures, devices, systems and methods of using a circular shaped, multi-domain, vertically aligned-liquid crystal display (LCD) that provides high transmittance, fast response, high contrast ratio and wide view angle.

BACKGROUND AND PRIOR ART

With the quick development and expansion of the liquid crystal display (LCD) market, high transmittance, fast response, high contrast ratio and wide view angle are usually required to get the higher quality liquid crystal display (LCD) devices. The higher quality attributes are critically required in large size monitors and television (TV) applications. Vertical alignment (VA) LCDs in normally black mode can provide a sufficiently dark off-state, so it is relatively easy to fabricate a LCD with high-contrast ratio. On the other hand, special techniques are needed to enhance the transmittance and improve the view angle. At present, multi-domain vertical alignment (MVA), patterned vertical alignment (PVA) and advanced-super-view (ASV) are the typical modes for getting the high quality display in VA LCDs on the market today.

The rapid evolution of flat screen and wall mounted display monitors has increased the demand for easy to fabricate devices and structures that provide high transmittance, fast response, high contrast ratio and wide view angles. The present invention presents another viable, inexpensive alternative.

Fujitsu Ltd. invented a super high quality MVA LCD as shown in FIG. 1. It was published in *SID Technical Digest*, vol. 29, p. 1077 (1998), *SID Technical Digest*, vol. 30, p. 206 (1999), *Fujitsu Science Technical Journal*, vol. 35, p. 221 (1999), and a typical MVA LCD is disclosed in U.S. Pat. No. 6,424,398 B1 to Taniguchi (2002). The chevron-patterned protrusions are created on the upper and lower substrates to form a multi-domain LCD cells in multiple independent directions. The devices provide a high contrast ratio higher than 300:1, view angle wider than 160 degrees, and a fast response of 25 ms while it has a limited transmittance of 3.4% to a 15" MVA LCD. In addition, since the horizontal gap between the upper and the lower protrusions must be less than 30 μm in order to obtain fast response time, the pixel alignment needs high precision. Thus, the design specification and preparation process are not easy and the aperture ratio is limited.

Patterned vertical alignment (PVA) was developed by Samsung Electronics Corp. as disclosed in U.S. Pat. No. 6,285,431 B2 to Lyu et al. in 2001, U.S. Pat. No. 6,570,638 to Song in 2003, and first published in *Journal of Information Display*, vol. 1, p. 3 (2000). In the PVA mode, a fringe field at the patterned indium tin oxide (ITO) drives the LC materials into different directions to form the multi-domains in the on-state as shown in FIG. 2. Instead of bulky protrusions in MVA, PVA uses thin patterned-ITO with slits, which results in a perfect vertically aligned LC cell structure with easy process control. The shapes of the slits are usually rectangular, tilted or zig-zag in series. The devices provide a high contrast ratio higher than 500:1, view angle at 160 degrees, a fast response of 25 ms and a high transmittance at 69% as that of a twisted nematic (TN) cell.

Advanced-super-view (ASV) was developed by Sharp Corp. as described in *SID Technical Digest*, vol. 32, p. 1090 (2001), and *IDW Technical Digest*, p. 203 (2002). In the ASV mode, LCs are vertically aligned in the off-state. When the electric filed is applied, LCs tilt towards the center of the sub-pixel electrodes as shown in FIG. 3. The LCs in an ASV LCD mode would face all directions, so the image looks the same no matter what the view angle is and a wide view angle can be guaranteed. Therefore, the wide view angle of 170 degrees, high contrast ratio of 500:1 and a fast response time of 16 milliseconds (ms) can be obtained in the advanced-super-view (ASV) mode using the special flashing backlight system. Since there are improper disclination lines existing in the on-state, the light transmittance is limited at 50% as that of a TN cell when no chiral dopant is added to the LC materials.

SUMMARY OF THE INVENTION

A primary objective of the invention is to provide a circular-shaped multi-domain vertical alignment (MDVA) mode liquid crystal display (LCD) using circular shaped openings, holes and slits.

A secondary objective of the invention is to provide a circular-shaped MDVA structure showing high transmittance.

A third objective of the invention is to provide a circular-shaped MDVA structure showing fast response time.

A fourth objective of the invention is to provide a circular-shaped MDVA structure showing high contrast ratio.

A fifth objective of the invention is to provide a circular-shaped MDVA structure showing wide view angle.

A sixth objective of the invention is to provide a LCD with simple structure and rubbing-free operation for high yield mass production.

A preferred multi-domain vertical alignment (MDVA) liquid crystal display with high transmittance, high contrast ratio and wide view angle is provided with a first substrate including a common electrode separated by a space from a second substrate including a pixel electrode positioned opposite the first substrate, a liquid crystal material filling the space between the first substrate and the second substrate, the first substrate and the second substrate consisting of a pixel unit, a common electrode and a plurality of pixel electrodes controlled by a storage electrode, at least one of the first substrate and the second substrate with a circular opening area without electrodes. The liquid crystal materials filling the space between the first and second substrates form a liquid crystal cell with negative dielectric constant anisotropy. The liquid crystal cell can be nematic liquid crystal material with or without chiral dopants.

The preferred liquid crystal display further comprises aligning layers made of polymeric material or inorganic material formed on the first and second substrates for liquid crystal vertical alignment.

One preferred MDVA liquid crystal display structure of the present invention includes two linear polarizers that form a crossed polarizer and at least one linear polarizer is disposed on the exterior surface of the liquid crystal cell.

Another preferred MDVA liquid crystal display structure of the present invention includes a linear polarizer and wide band quarter-wave film forming a circular polarizer, where at least one circular polarizer is disposed on the exterior surface of the liquid crystal cell.

The unique features of the MDVA liquid crystal display structure of the present invention are in the series of circular or ring-shaped openings on the first substrate and the second substrate, where the first and second substrates are positioned so that the ring-shaped openings of the first substrate are in alignment with the ring-shaped opening of the second substrate. In an alternate embodiment, the first substrate can have a series of ring-shaped openings and the second substrate can be a whole electrode without any openings and the first substrate and the second substrate are arranged to face each other. The opening area in either the first substrate or the second substrate is formed by etching or photolithography on a conductive electrode surface. The opening area can be shaped like rings, circles, round holes, or circular slits; the diameter of the opening area is not less than approximately 2 micrometers (μm).

The liquid crystal display of the present invention can also include at least one compensation film placed between a polarizer and either the first substrate or the second substrate. The compensation film is a combination of negative birefringence and uni-axial birefringence and can be one or a combination of a negative c-plate and a positive a-plate. If the compensation film is a biaxial film, it functions to further enlarge the viewing angle of the liquid crystal display (LCD).

Further objects and advantages of this invention will be apparent from the following detailed descriptions of the presently preferred embodiments which are illustrated schematically in the accompanying drawings.

BRIEF DESCRIPTION OF THE FIGURES

FIG. 2 shows a general structure of PVA mode liquid crystal display developed by Samsung Electronics Corp (Prior Art).

FIG. 2A is the PVA mode liquid crystal display in the OFF state. (Prior Art)

FIG. 2B is the PVA mode liquid crystal display in the ON state. (Prior Art)

FIG. 4A shows a general device configuration of a VA mode liquid crystal display with linear polarizers.

FIG. 4B shows a general device configuration of a VA mode liquid crystal display with circular polarizers.

FIG. 5 shows a simplified pixel configuration of the new circular-shaped VA mode in Embodiment 1.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

It would be useful to discuss the definition of some words and acronyms used herein and their application before discussing the invention, which provides a superior liquid crystal display device or structure.

ASV—advanced-super-view liquid crystal display developed by Sharp Corp. and uses a special flashing backlight.

MVA—multi-domain vertical alignment liquid crystal display developed by Fujitsu Ltd.; noted for bulky, chevron pattern protrusions that require precise pixel alignment.

PVA—patterned vertical alignment liquid crystal display developed by Samsung Electronics Corp with thin chevron patterned apertures.

TFT—thin film transistor or voltage source for a liquid crystal display device

Multi-domain—describes an LCD device having a plurality of domains defined in each pixel, the visual angle characteristic is improved in the display state.

The present invention is easy to fabricate and provides a new multi-domain vertical alignment (MVA) liquid crystal display (LCD) device structure for achieving high transmittance, fast response time, high contrast ratio and wide view angle using circular shaped slits in the VA mode. It is rubbing-free and has a simple preparation process, which is fit for the conventional thin film transistor (TFT) and LCD fabrication processes.

Figure 1:
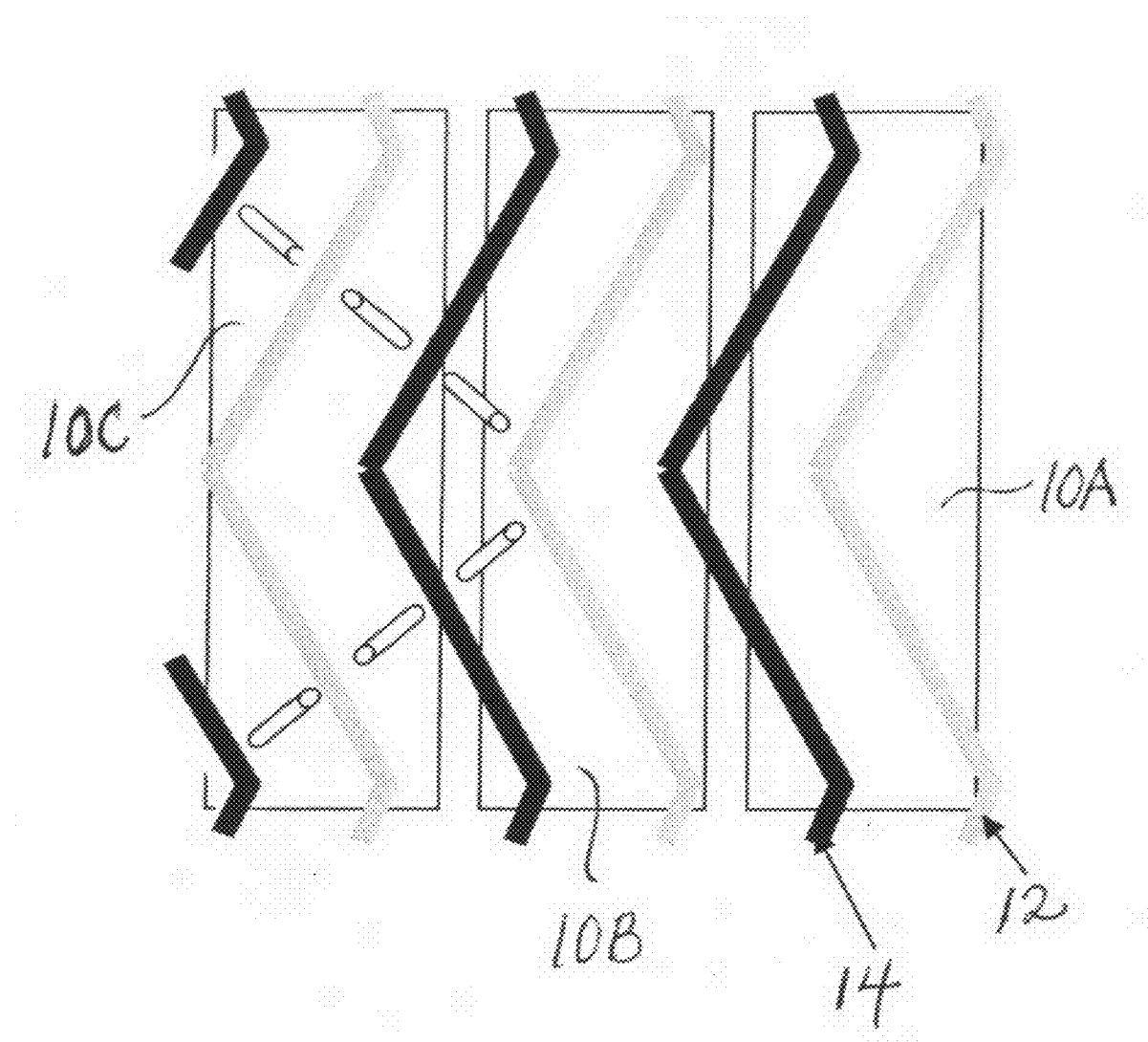
FIG. 1 shows a general structure of MVA mode liquid crystal display developed by Fujitsu Ltd (Prior Art).

FIG. 1 is a plan view of a multi-domain liquid-crystal display with three pixel electrodes 10A, 10B and 10C with chevron protrusion patterns on a top substrate 12 and chevron protrusion patterns on a bottom substrate 14; this configuration reportedly minimizes the coloring of the display screen in the white display state.

FIG. 2A shows the OFF state of a patterned vertical alignment (PVA) structure when the electric field is not applied, and the long molecular axes of the liquid crystal molecules 2 in the liquid crystal layer 20 are aligned perpendicular to the surface of the substrates 4 and 6 by the aligning force of the alignment layers.

FIG. 2B shows the ON state of a patterned vertical alignment (PVA) structure when the electric field is applied to the liquid crystal layer 20 sandwiched between electrodes 8 and 10, where the liquid crystal molecules 2a in the liquid crystal layer 20 are bent between the lower substrate 6 and the upper substrate 4, and the director of the liquid crystal layer 20 varies continuously. However, near the inner surfaces of two substrates 4 and 6, the aligning force of the alignment layers is larger than the force due to the applied electric field, and the liquid crystal molecules 2b stay vertical alignment.

Figures 3, 3A, 3B:
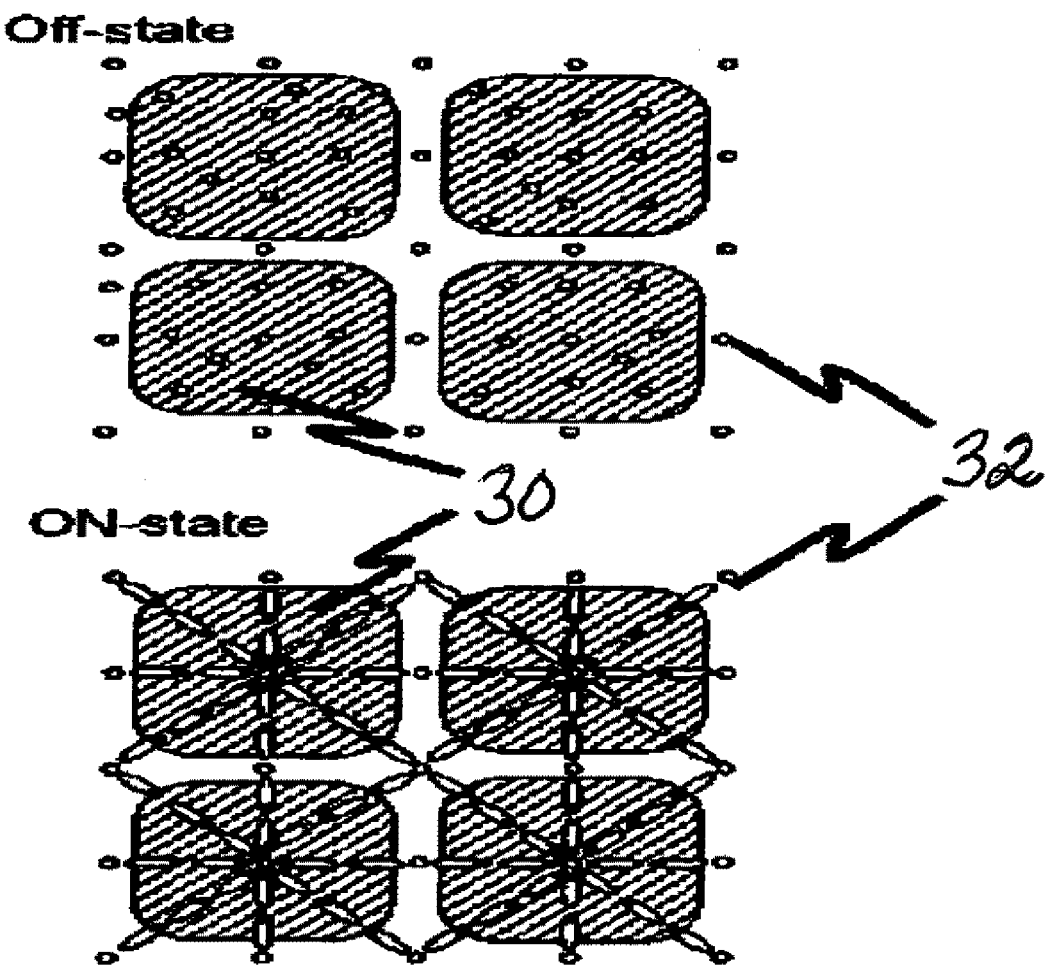
FIG. 3 shows a general structure of ASV mode liquid crystal display developed by Sharp Corp (Prior Art).
FIG. 3A is the ASV mode liquid crystal display in the OFF state. (Prior Art)
FIG. 3B is the ASV mode liquid crystal display in the ON state. (Prior Art)

FIG. 3 shows pixel electrodes 30 with openings and liquid crystal molecules 32 in an advanced super view (ASV) mode developed by Sharp Corp. In FIG. 3A, the OFF state shows the liquid crystal molecules 32 in vertical alignment. In the ON state the liquid crystal molecules 32 tilt towards the center of the sub-pixel electrodes 30 which show a nearly axial symmetric alignment as plotted by the grid lines in FIG. 3B.

FIG. 4A shows a typical device configuration of the present invention comprising a backlight source 40, a first linear polarizer 42 and a second linear polarizer 44, which are directionally crossed at approximately a 90 degree angle to each other and wherein a vertical alignment liquid crystal material 46 is sandwiched between the first and second linear polarizers, 42 and 44, respectively. In the device of the present invention, shown in FIG. 4B, the circular shaped LC cell 46 is placed between the crossed linear polarizers 42 and 44 with a first wideband quarter wave film at 135° 410 adjacent to and above the first linear polarizer 42 and a second wideband quarter wave film at 45° 412 adjacent to and below the second linear polarizer 44. The positioning of the crossed linear polarizers 42, 44 and the wideband quarter wave films 410 and 412 form circular polarizers that influence a homeotropic alignment of the LC molecules without a rubbing process and the VA mode of the liquid crystal cell 46 at null voltage state Two distinct embodiments of the present invention are disclosed. Embodiment one has a common electrode and a signal electrode wherein both have circular-shaped openings, holes and slits. Embodiment two uses a common electrode and a signal electrode wherein only one electrode has circular-shaped openings, holes and slits. The openings, holes and slits are formed by etching or using photolithography on the electrode surfaces and are collectively considered as circular or ring-shaped areas without electrode connections.

Referring now to the pixel configuration of the present invention, a simplified pixel configuration of the new circular-shaped VA mode is shown in FIG. 5. A first substrate 500 has a ring-shaped opening 54 around a centrally located, circular-shaped electrode 53, and another ring-shaped opening 55 around a ring-shaped electrode 50. The circular and ring-shaped electrodes 50 and 53 function as the common electrode. A second substrate 510 has a circular-shaped opening 56 that is centrally located in a ring-shaped electrode 51; another circular-shaped opening 57 forms a ring within the electrode surface 52. When the second substrate 510 is positioned opposite the first substrate 500, the electrodes 51 and 52 function as the signal electrode. Both the common electrode 50 and the signal electrode 52 are connected to a thin film transistor (TFT) 150. Thus the basic configuration is to have the common electrodes formed in a series of ring-shaped or circular patterns or have the signal electrodes formed with a series of ring-shaped or circular openings and slits in the electrode.

Figure 6A:
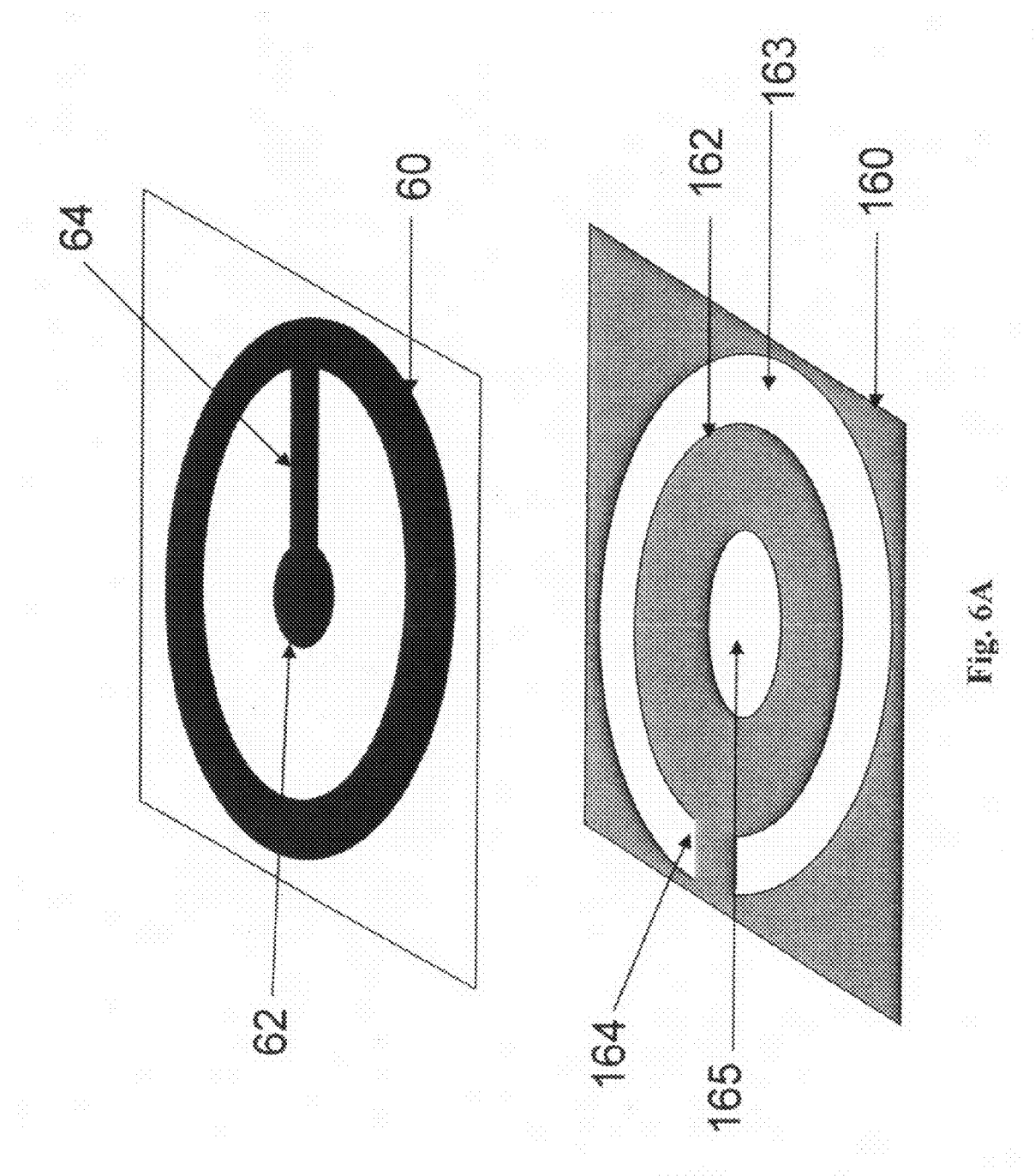
FIG. 6A shows a first typical pixel configuration of the new circular-shaped VA mode in Embodiment 1 with one connection.

The pixel configuration of embodiment one of the new multi-domain, circular-shaped VA mode of the present invention with one connection, is shown in FIG. 6A. The common electrode 60 has a ring shape and a circular center of indium tin oxide (ITO) material 62 with one connection 64 to the outer ring of the common electrode 60. The signal electrode 160 has a ring-shaped opening 163 and circular center 162 with one connection 164 to the outer ring that forms a mirror-image of the common electrode 60 when spaced apart and placed in parallel alignment. Indium tin oxide (ITO) is the material used to form the signal electrode 160, the circular center 162 and the one connection 164. The ring-shaped opening 163 and circular opening 165 are open spaces formed by an etching process.

Figure 6B:
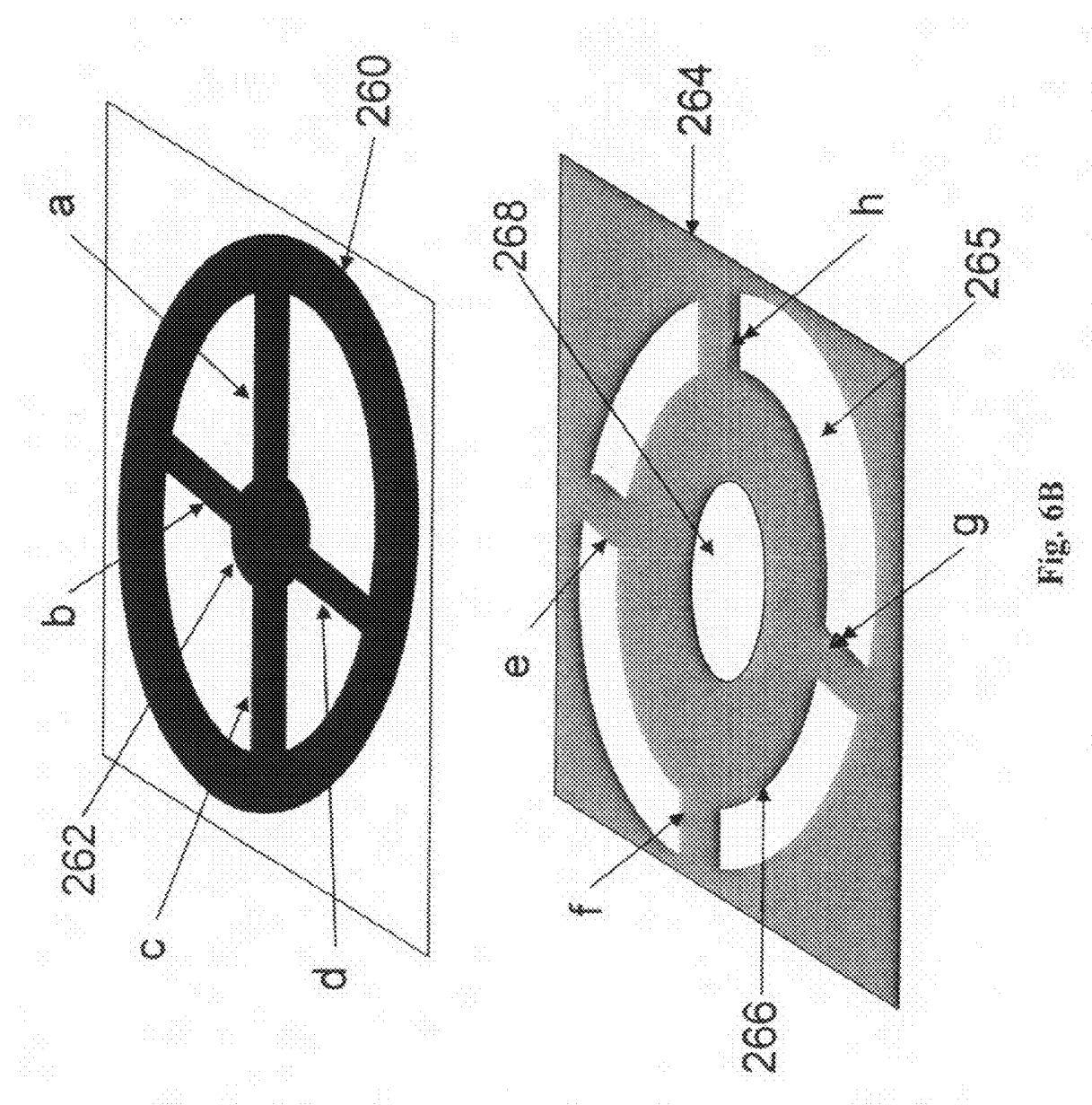
FIG. 6B shows a second typical pixel configuration of the new circular-shaped VA mode in Embodiment 1 with a crossed connection.

The pixel configuration of embodiment one of the new multi-domain, circular-shaped VA mode of the present invention with the crossed-connection is shown in FIG. 6B. A common electrode 260 has a circular shape, a circular center of indium tin oxide (ITO) material 262 and crossed connections that intersect the outer ring of the common electrode 260 with four small connection parts a, b, c, d. The signal electrode 264 has a circular shaped ring 266 with four small connection parts e, f, g, h such that when spaced apart and placed in parallel alignment with the common electrode 260, the pattern of the signal electrode 264 forms a mirror image of the common electrode 260. The broken ring-shaped openings 265 and the circular-shaped opening 268 are formed by an etching process.

Figure 7:
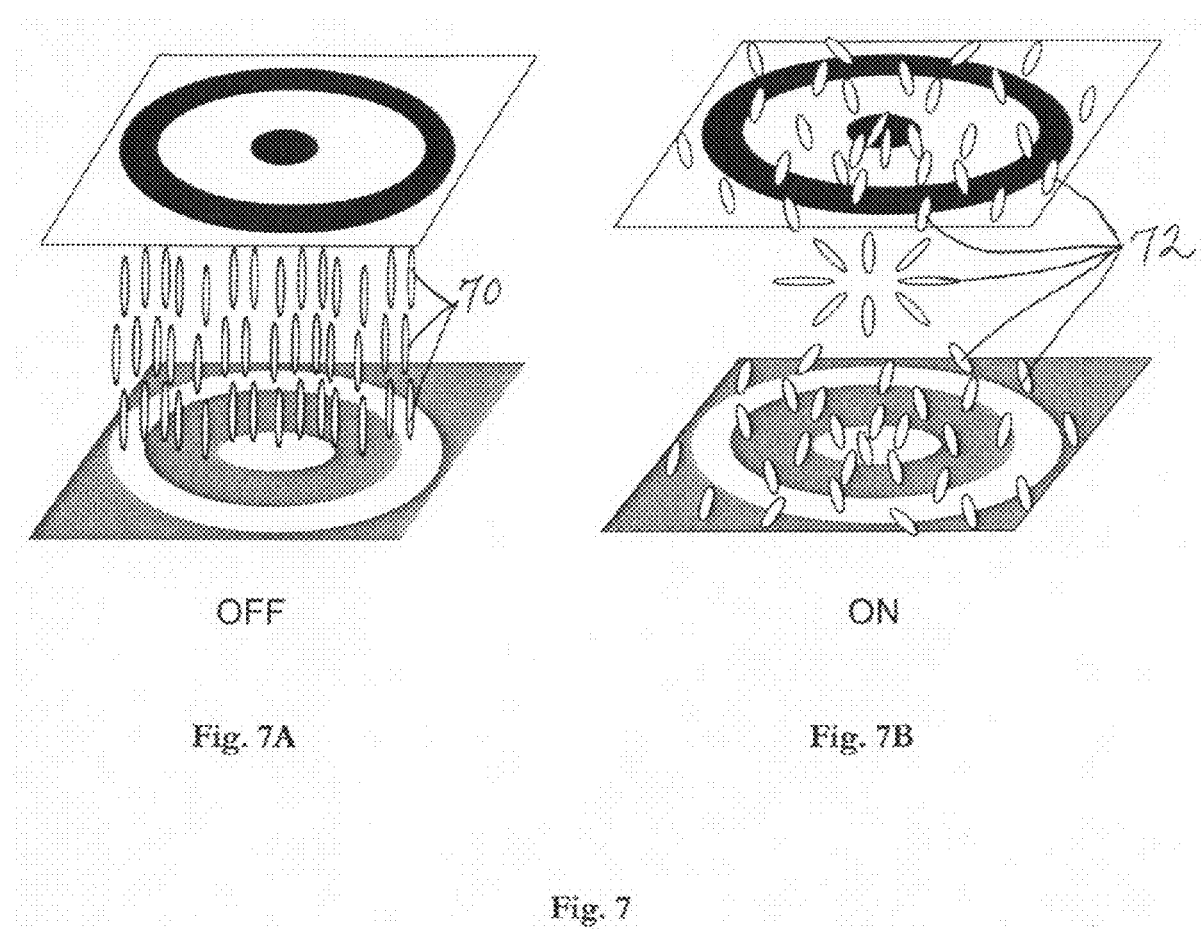
FIG. 7A shows the operating mechanism of the multi-domain circular-shaped VA mode of Embodiment 1 in the OFF state.
FIG. 7B shows the operating mechanism of the multi-domain circular-shaped VA mode of Embodiment 1 in the ON state.

Both the top and bottom indium tin oxide (ITO) substrates are formed with a series of ring-shaped openings, holes or slits. The position of the openings, holes or slits in each of the opposing substrates are in alignment with each other, although the diameter of ring-shaped slits on the top substrate can be smaller, equal to or larger than that of the corresponding ring-shaped openings in the indium tin oxide (ITO) material on the bottom substrate. When there is no voltage applied, the incident light is completely blocked by the crossed polarizers and an excellent dark state can be obtained in the normally black mode as shown in FIG. 7A. When the voltage is applied, fringing electric fields are created and surround the top ring-shaped slits/ITO and the bottom ring-shaped ITO/slits. The LC directors in-between them with negative dielectric constant anisotrophy ($\Delta\epsilon<0$) are reoriented and have the tendency to be perpendicular to the electric field direction. Therefore, light is transmitted to the crossed polarizers as shown in FIG. 7. FIG. 7A shows that when no voltage is applied, the liquid crystal molecules 70 are vertical alignment. In the "ON" state, as shown in FIG. 7B, LC molecules 72 will be tilted or bent in all directions, and dual- or multi-axial symmetric LC alignment is formed in the LC cell in the meantime. A wide view angle can be easily achieved under this condition.

Figure 8:
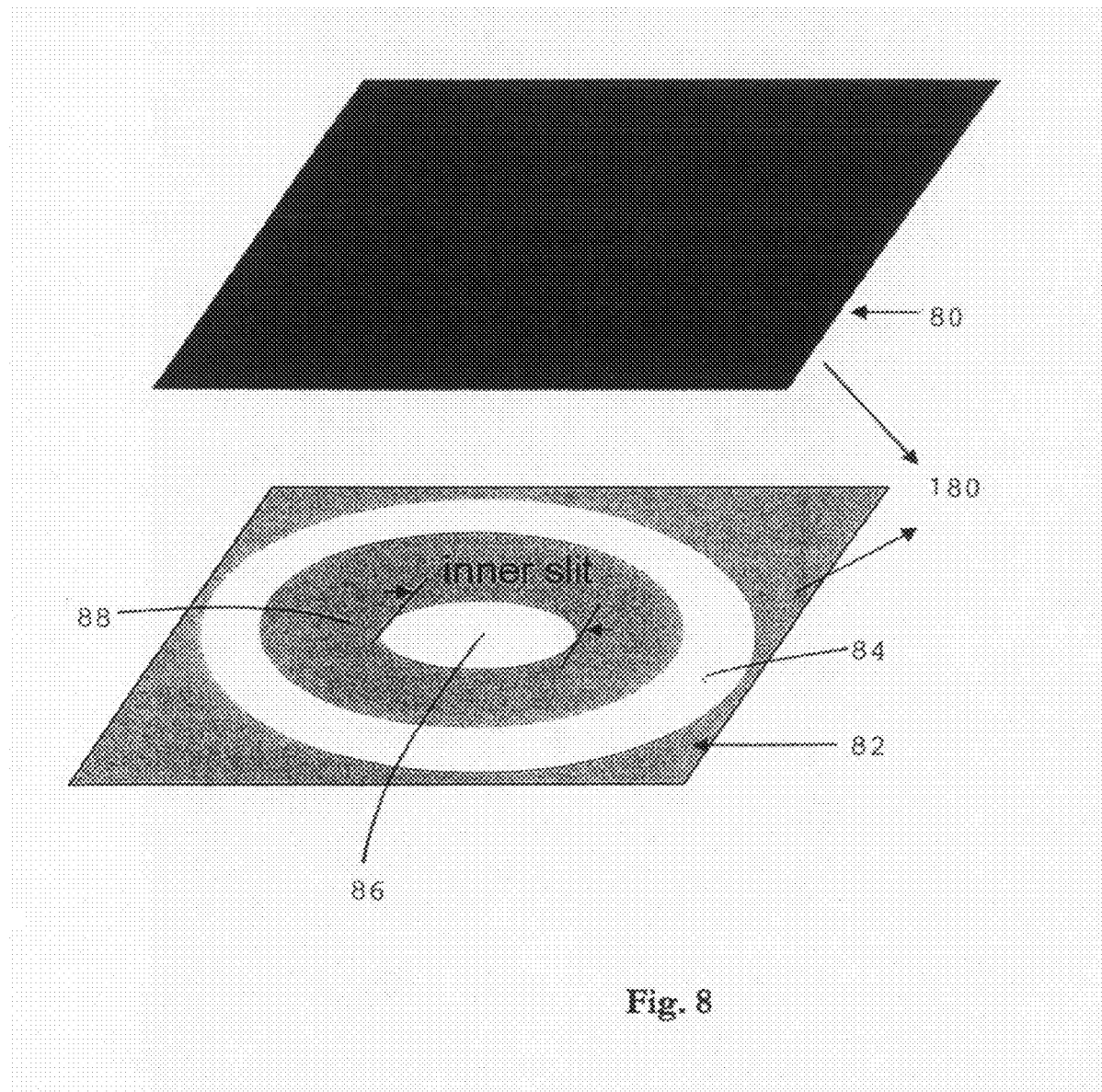
FIG. 8 shows a simplified pixel configuration of the new circular-shaped VA mode of Embodiment 2.

A simplified pixel configuration of embodiment two using the new circular-shaped VA mode is shown in FIG. 8. A first substrate 80 is formed as a one-piece layer of indium tin oxide (ITO) and functions as the common electrode, while a second substrate 82 is formed with a series of ring-shaped openings 84, holes 86 and ITO substrate 88 which functions as the signal electrode. The one-piece layer can be either at the top or bottom. Both electrodes are connected to a storage electrode, such as a thin film transistor 180. When there is no voltage applied, the incident light is completely blocked by the crossed polarizers and an excellent dark state can be obtained in the normally black mode. When the voltage is applied, fringing electric fields are created that surround the ring-shaped slits/ITO and the one-piece layer of indium tin oxide (ITO) whether at the top or bottom of the pixel configuration.

In FIGS. 9A and 9B there are a top ITO substrate 90 and a bottom ITO substrate 92; one substrate 92 is formed in a series of circular or ring-shaped openings, holes or slits, while the other substrate 90 is a one-piece layer of ITO. As in FIG. 8, the one piece layer can be used as either the top or the bottom substrate. When there is no voltage applied, the incident light is completely blocked by the crossed polarizers and an excellent dark state can be obtained in the normally black mode. When the voltage is applied, fringing electric fields are created that surround the top ring-shaped slits/ITO and the bottom ITO, or vice versa FIG. 9A shows the pixel arrangement of embodiment two with one connection point a. FIG. 9B shows the pixel arrangement of embodiment two with four connection points a, b, c, d. The LC directors in-between the top and bottom substrates with negative dielectric anisotropy ($\Delta\varepsilon<0$) are reoriented and have the tendency to be perpendicular to the electric field direction. Therefore, light is transmitted to the crossed polarizers as shown in FIG. 10.

FIG. 10A shows the device in the OFF state where dual- or multi-axial symmetric LC alignment is formed in the LC cell 100. In the ON state, as shown in FIG. 10B, the LC molecules 102 will be tilted or bent in all directions, and a wide view angle can be achieved easily with this device.

The present invention has identified multiple embodiments for the circular-shaped vertical alignment (VA) liquid crystal display (LCD) mode, including, but not limited to, the two embodiments described in detail below. The following examples are provided for the purpose of illustration and not limitation.

EXAMPLE 1

The LC device structures of embodiment one are shown in FIGS. 5, 6 and 7. Embodiment one has openings, holes and slits in both the top and bottom substrates. The diameters of the inner ITO and inner slit are 2 micrometers (μm) and 3 micrometers (μm) in the top and bottom substrates respectively, and the diameter of the following slits, openings or electrodes has an increase of 4 μm for every ring-shaped opening or electrode added thereafter, forming a series of ring-shaped openings- or electrodes until the outer-most ring-shaped opening or electrode is formed on either the top or bottom substrate. The cell gap between the top and bottom substrates is 4 μm. Negative LC mixture MLC-6608 (Merck Company: birefringence $\Delta n=0.083$, dielectric anisotropy $\Delta\varepsilon=-4.2$ and rotational viscosity $\gamma_1=0.16$ Pa·s) is aligned vertical to the substrates in the initial state. Its azimuthal angle is 0.5°, and the pretilt angle is 88°.

Figure 11:
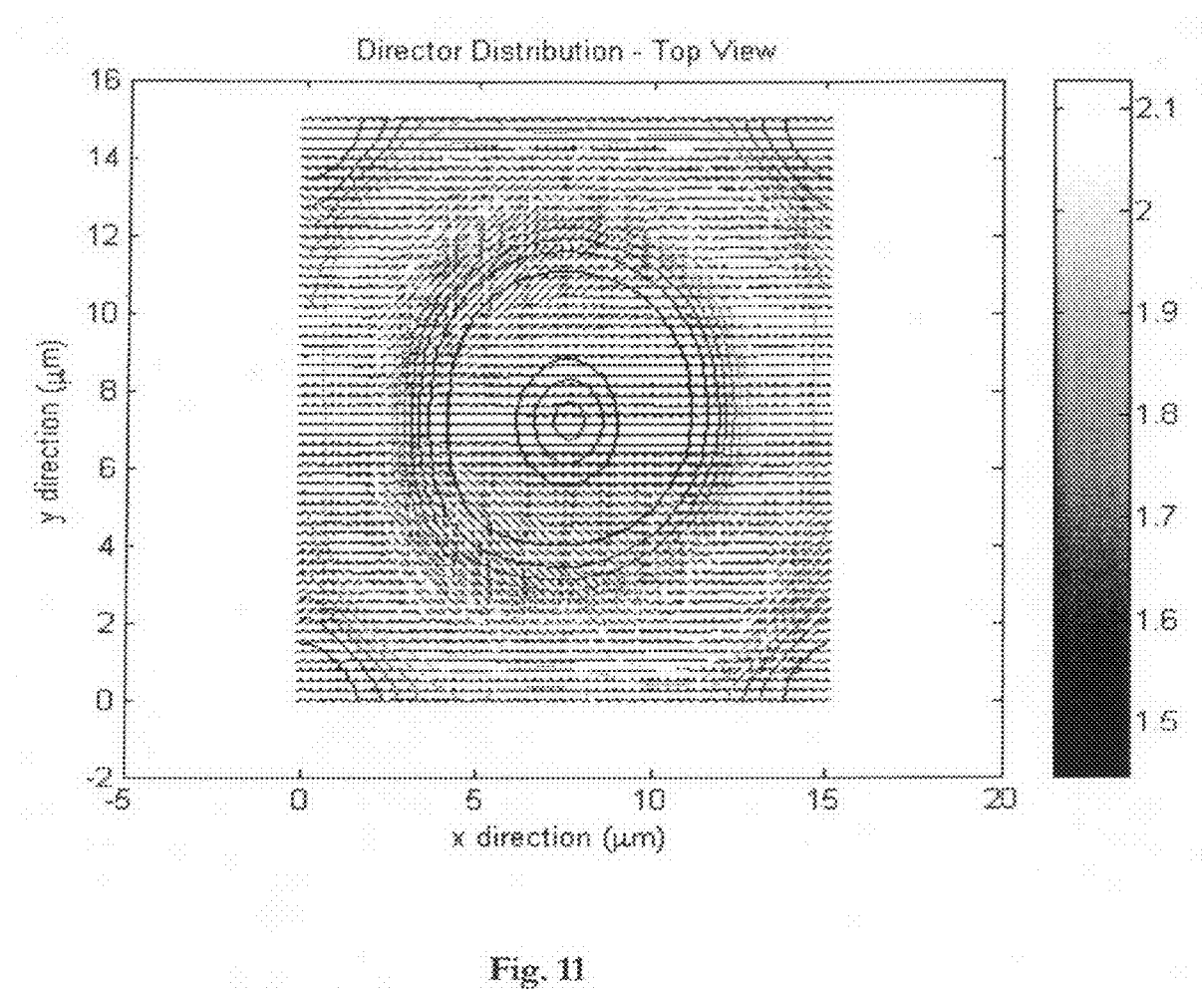
FIG. 11 shows the simulated LC director distribution of the VA cell using Merck LC material MLC-6608 as an example in Embodiment 1. The applied voltage is $V=6\ V_{rms}$.

FIG. 11 is the simulated LC director distribution of embodiment one when the applied voltage is 6 $V_{rms}$. The LC directors are reoriented along the electric field direction due to the fringing field effect In the plan view, the LC directors show ring-shaped multi-domain distribution.

Figure 12:
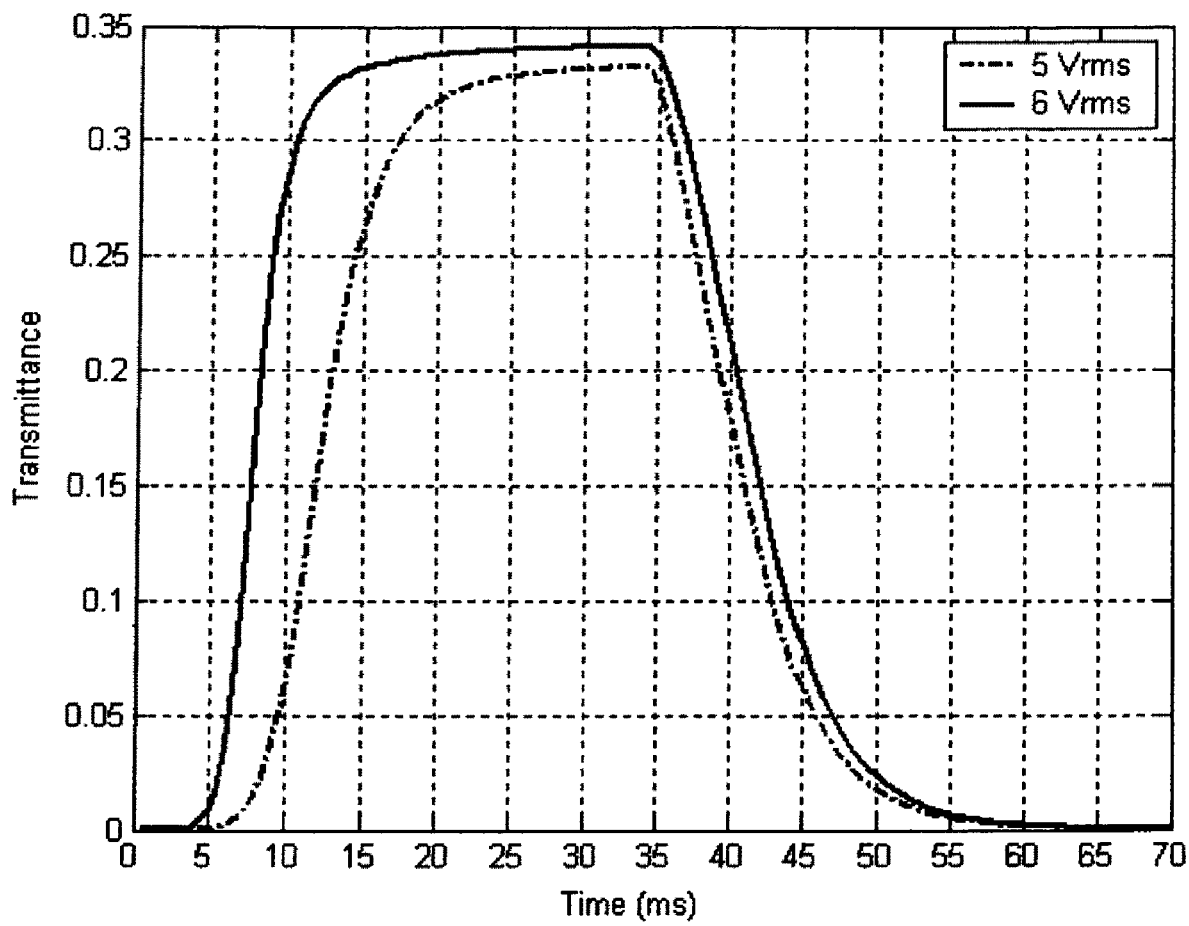
FIG. 12 shows the time-dependent transmittance of the VA device at different applied voltages using Merck LC material MLC-6608 at $\lambda=550$ nm in Embodiment 1.

FIG. 12 is the time-dependent transmittance of the embodiment one device at different applied voltages at λ=550 nanometers (nm). After taking into account the optical losses of polarizers, the transmittance is 0.33, 0.34 at voltages of 5 $V_{rms}$ and 6 $V_{rms}$, respectively, for the wavelength λ=550 nm. Since the adopted crossed polarizers have a maximum transmittance of 0.35 to 90° twisted nematic (TN) cell, the proposed VA cell has a high transmission of 94% and 97% at 5 $V_{rms}$ and 6 $V_{rms}$, respectively, as that of a TN cell. From FIG. 12, it can also be seen that the device has a fast response time of 23 milliseconds (ms) (rise+decay) when a 6 $V_{rms}$ voltage is applied to the cell.

Figure 13:
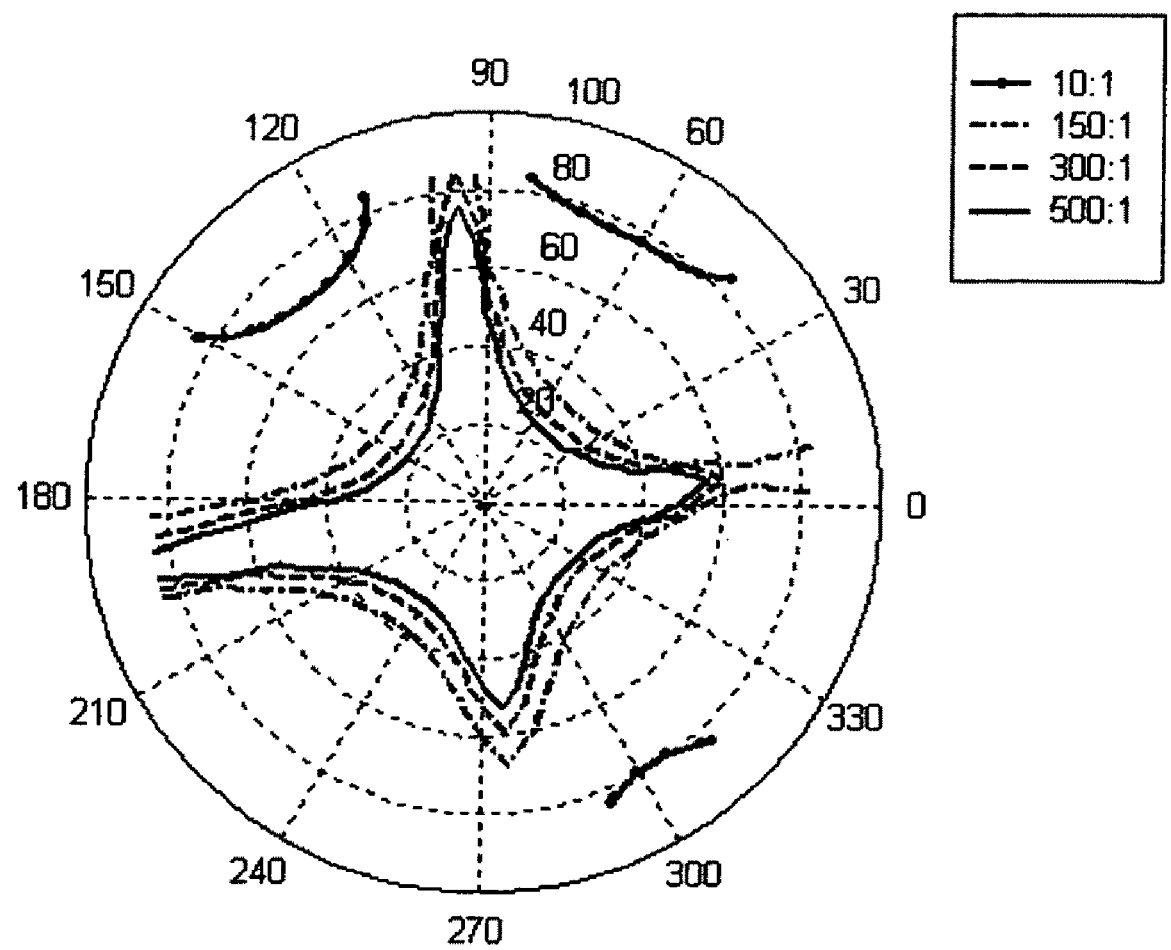
FIG. 13 shows the iso-contrast bar of the VA device between 0 Vrms and 6 Vrms in Embodiment 1, where compensation films of a- and c-plates are added at the thickness of 50 nanometers (nm) and 1200 nm before and after the polarizer and analyzer, respectively.

It has been known that a uniaxial and negative birefringence films or biaxial films are needed for a VA mode to exhibit a wide viewing angle. [S. T. Wu and D. K. Yang, *Reflective Liquid Crystal Displays* (Wiley, Chichester, 2001); Chap. 12]. As an example, a pair of negative c-plates and positive a-plates was used as the compensation films to show the view angle ability of the proposed VA device. Compensation films of a- and c-plates are added at the thickness of 50 nanometers (nm) and 1200 nanometers (nm) before and after the polarizer and analyzer, respectively. As shown in FIG. 13, the iso-contrast bar of 10:1 has been reaching ±80° except in azimuthal range from 110° to 150°. The proposed VA device has wide view angle larger than 155° in total, which can be further improved by choosing more appropriate film parameters. In addition, the device has a high contrast ratio nearby the center area that is better than 500:1.

EXAMPLE 2

Figure 9:
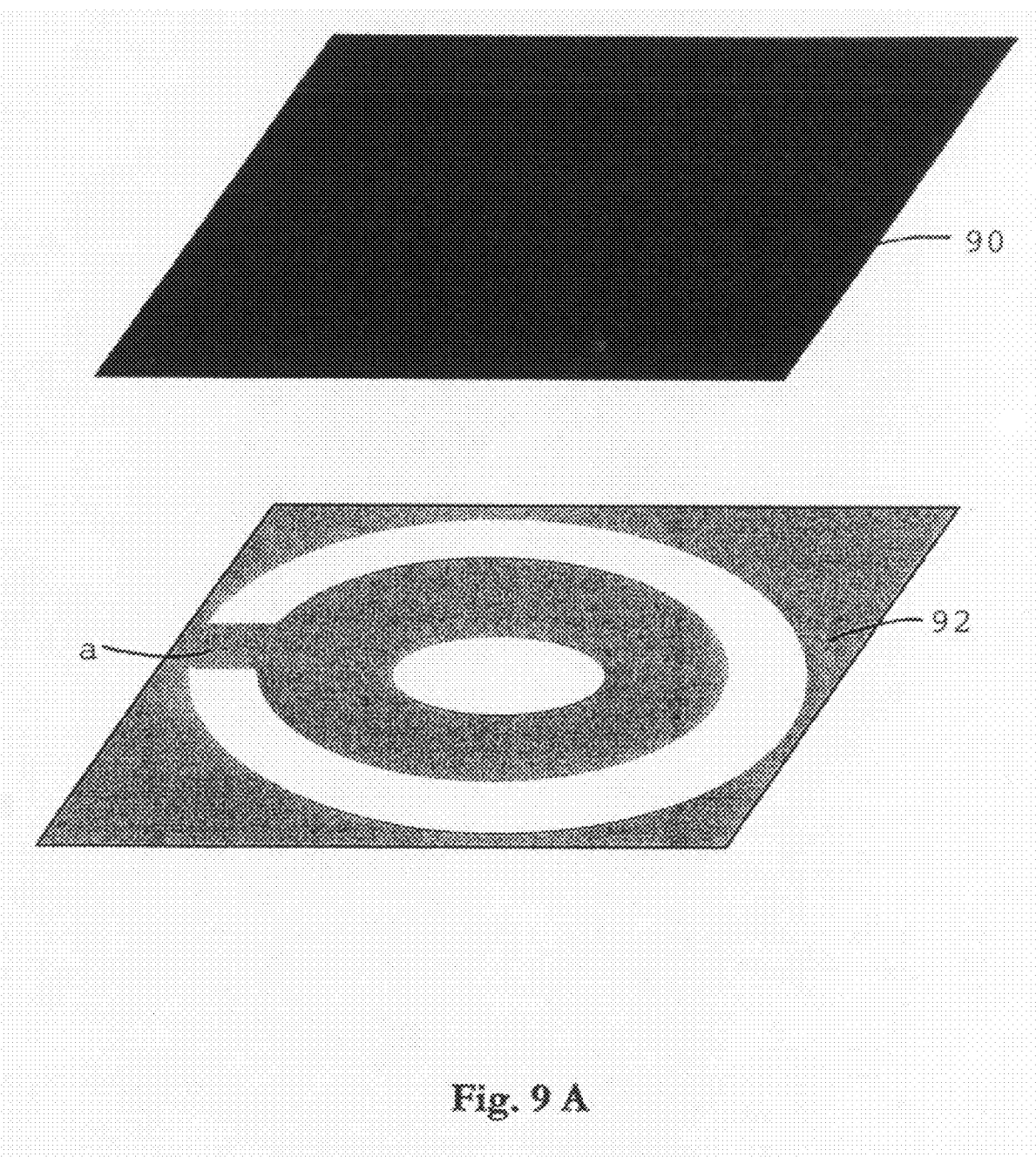
FIG. 9A shows a first typical pixel configuration of the new circular-shaped VA mode of Embodiment 2 with one connection.
FIG. 9B shows a second typical pixel configuration of the new circular-shaped VA mode of Embodiment 2 with a crossed connection.
Figure 9:
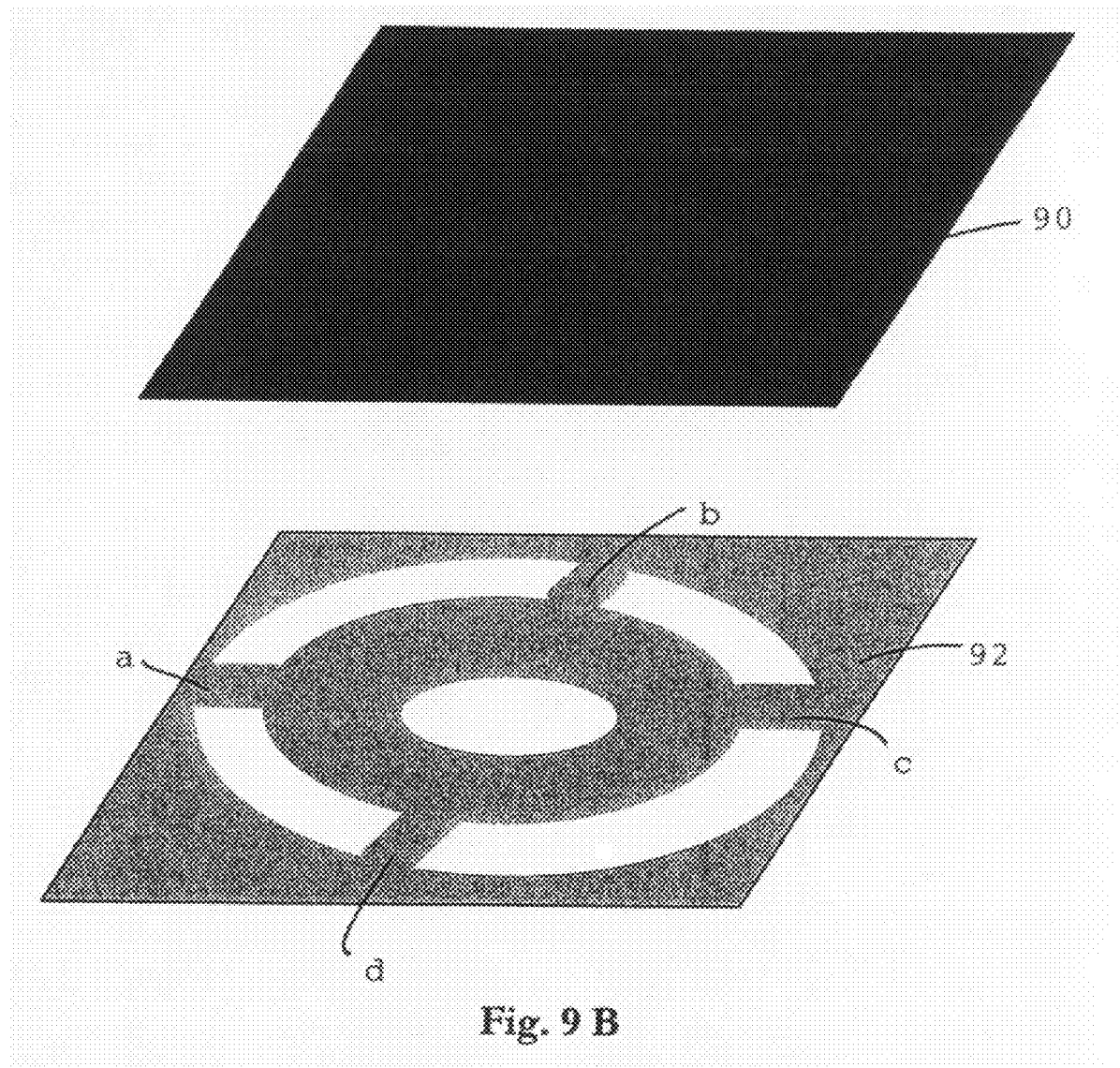
Figure 10:
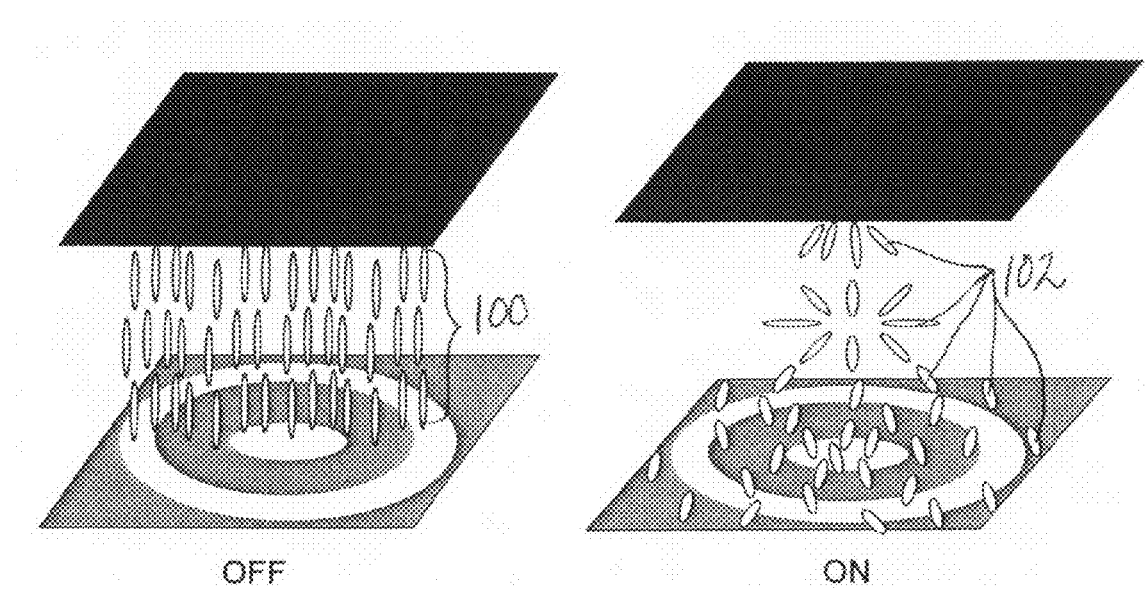
FIG. 10A shows the operating mechanism of the multi-domain circular-shaped VA mode of Embodiment 2 in the OFF state.
FIG. 10B shows the operating mechanism of the multi-domain circular shaped VA mode of Embodiment 2 in the ON state.

The LC device structures of embodiment 2 are shown in FIGS. 8, 9 and 10. Embodiment 2 has openings, holes and slits in one substrate only; it can be either a top substrate or a bottom substrate. For example, the diameter of the inner slit can be 3 μm to the bottom substrate, and the diameter of the following slits, openings or electrodes has an increase of 4 μm for every ring-shaped opening or electrode added thereafter, forming a series of ring-shaped openings or electrodes until the outer-most ring-shaped opening or electrode is formed on the substrate with openings, holes and slits. The cell gap between the top and bottom substrates is 4 μm. Negative LC mixture MLC-6608 (Merck Company: birefringence $\Delta n=0.083$, dielectric anisotropy $\Delta\varepsilon=-4.2$ and rotational viscosity $\gamma_1=0.16$ Pa·s) is aligned vertically to the substrates in the initial state. Its azimuthal angle is 0.5°, and the pretilt angle is 88°.

Figure 14:
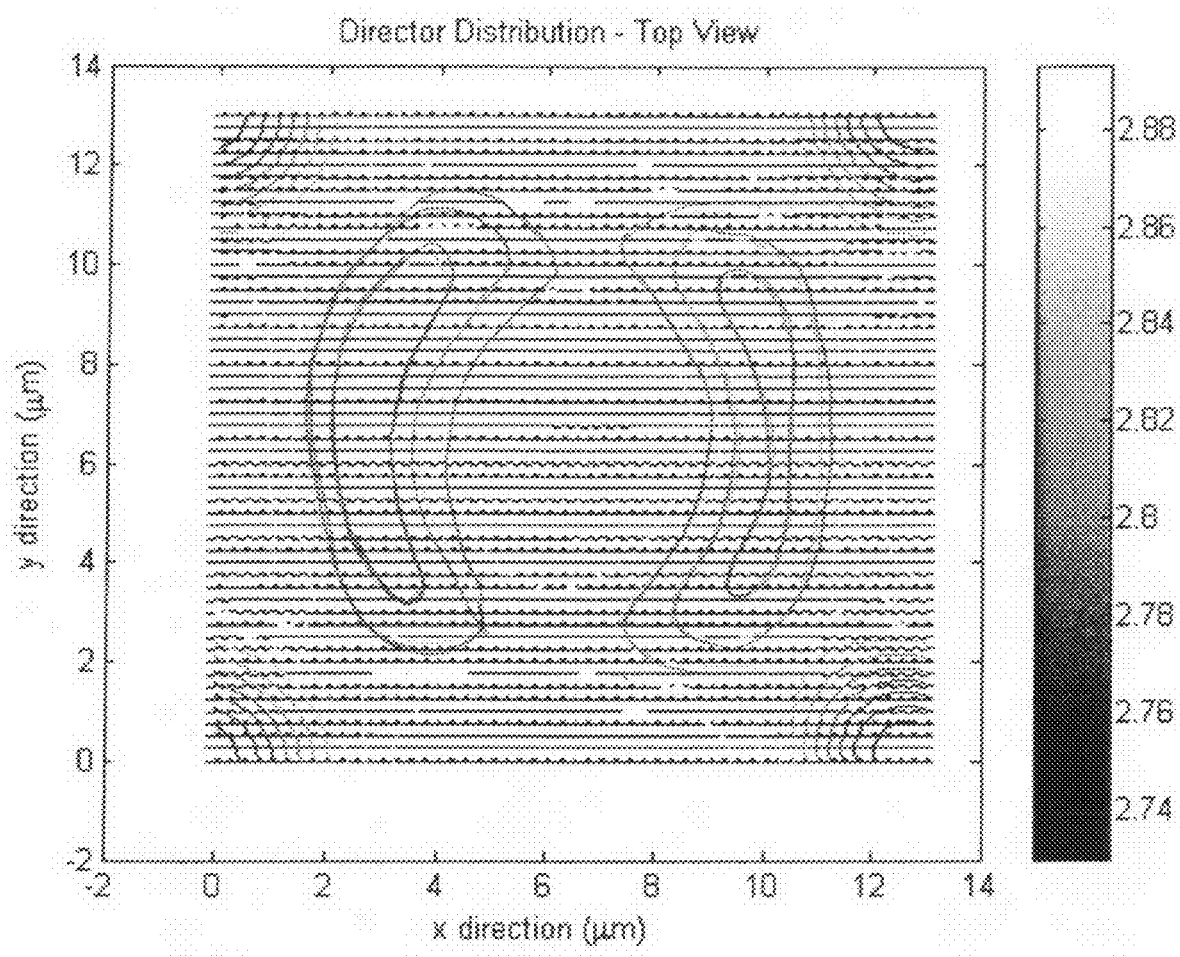
FIG. 14 shows the simulated LC director distribution of the VA cell using Merck LC material MLC-6608 as an example in Embodiment 2. The applied voltage is $V=6\ V_{rms}$.

FIG. 14 shows the LC director distribution of embodiment two when the applied voltage is 6 $V_{rms}$. The LC directors are reoriented perpendicular to the electric field direction due to the fringe field effect. It has the appearance of a ring-shaped multi-domain distribution from a plan or top view.

Figure 15:
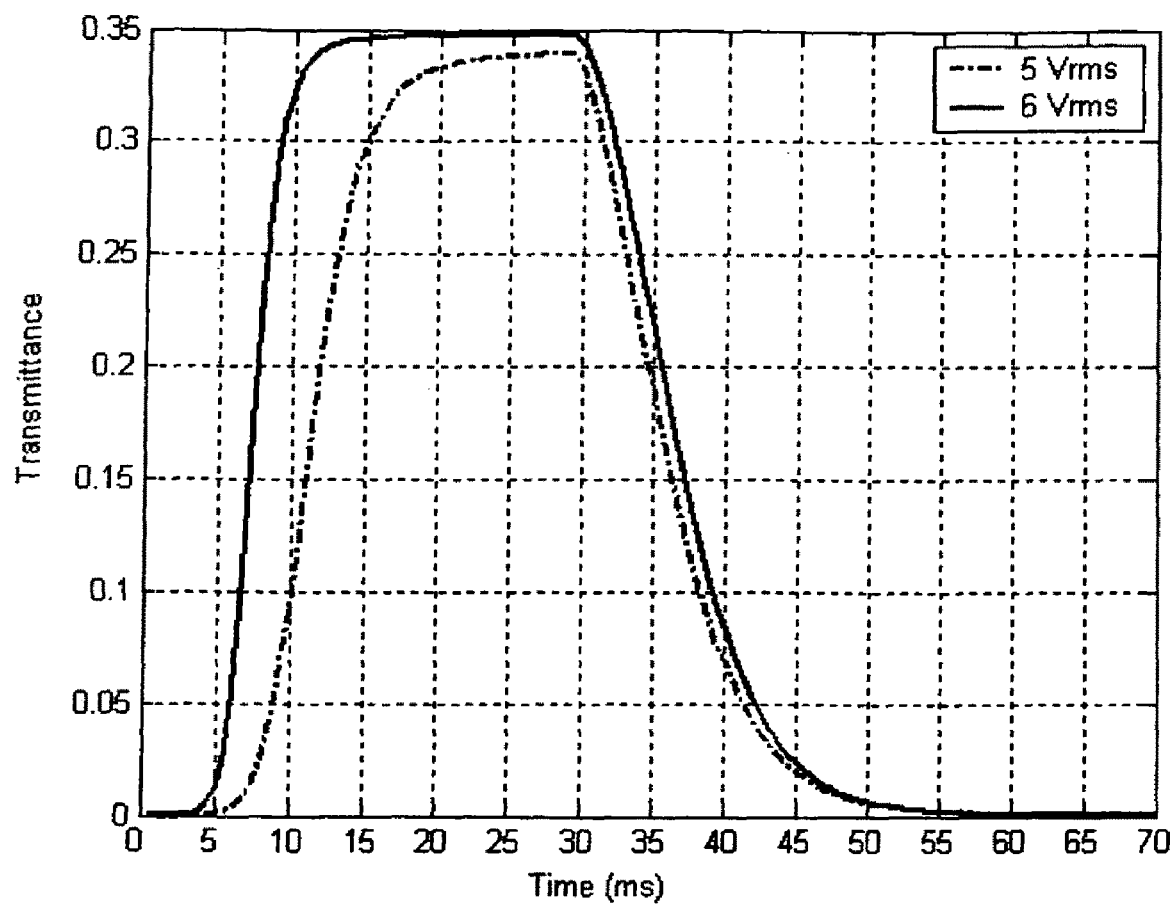
FIG. 15 shows the time-dependent transmittance of the VA device at different applied voltages using Merck LC material MLC-6608 at $\lambda=550$ nm in Embodiment 2.

FIG. 15 is the time-dependent transmittance of the embodiment two device at different applied voltages at λ=550 nm. After taking into account the optical losses of polarizers, the transmittance is 0.338, 0.347 at voltages of 5 $V_{rms}$ and 6 $V_{rms}$, respectively, for the wavelength λ=550 nanometers (nm). Since the adopted crossed polarizers have a maximum transmittance of 0.35 to 90° twisted nematic (TN) cell, the proposed VA cell has a high transmission of 96% and 99% at 5 $V_{rms}$ and 6 $V_{rms}$, respectively, similar to that of TN cell. From FIG. 15, it can also be seen that the device has a fast response time of 21 milliseconds (ms) (rise+decay) when a 6 $V_{rms}$ voltage is applied to the cell. As an example, we use a pair of negative c-plates and positive a-plates as the compensation films to show the view angle ability of the proposed VA device. Compensation films of a- and c-plates are added at the thickness of 50 nm and 1320 nm before and after the polarizer and analyzer, respectively.

Figure 16:
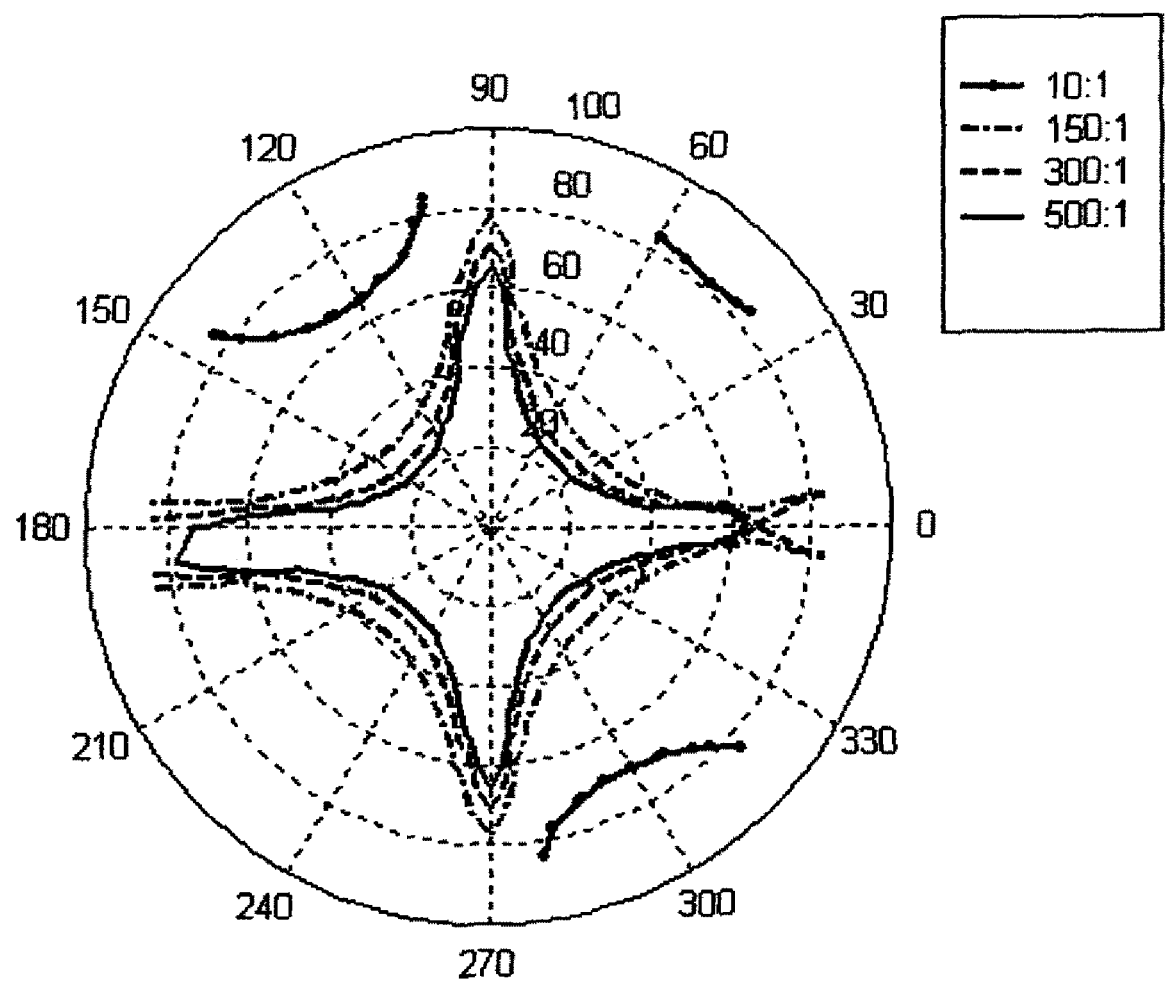
FIG. 16 shows the iso-contrast bar of the VA device between 0 Vrms and 6 Vrms in Embodiment 2, where compensation films of a- and c-plates are added at the thickness of 50 nm and 1320 nm before and after the polarizer and analyzer, respectively.

As shown in FIG. 16, the device of embodiment two has a wide view angle larger than 150° overall. In addition, it has a high contrast ratio nearby the center area that is better than 500:1. Therefore, the new VA mode has a high transmittance, fast response, high contrast ratio and wide view angle, which is particularly suitable for LC television (TV) and computer monitor applications.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A multi-domain vertical alignment liquid crystal display with high transmittance, high contrast ratio and wide view angle comprising:
    a first substrate including a common electrode formed as a one-piece layer of indium tin oxide without openings separated by a space from a second substrate including a plurality of pixel electrodes having a ring-shaped opening and a circular center opening wherein portions of the pixel electrodes separated by the ring-shaped opening are connected by a common radial connector;
    a liquid crystal material filling the space between the first substrate and the second substrate; and
    the common electrode and plurality of pixel electrodes controlled by a storage electrode.

2. A multi-domain vertical alignment liquid crystal display of claim 1, wherein the liquid crystal materials filling the space between the first and second substrates form a liquid crystal cell with negative dielectric constant anisotropy.

3. A multi-domain vertical alignment liquid crystal display of claim 2, wherein the liquid crystal cell is nematic liquid crystal material without chiral dopants.

4. A multi-domain vertical alignment liquid crystal display of claim 1, wherein the liquid crystal display further comprises aligning layers formed on the first and second substrates for liquid crystal vertical alignment.

5. A multi-domain vertical alignment liquid crystal display of claim 4, wherein the aligning layers are selected from at least one of polymeric material and inorganic material.

6. A multi-domain vertical alignment liquid crystal display of claim 1, wherein the liquid crystal display further comprises two linear polarizers that form a crossed polarizer and at least one linear polarizer is disposed on the exterior surface of the liquid crystal cell.

7. A multi-domain vertical alignment liquid crystal display of claim 1, wherein the opening area in the second substrate is formed by at least one of etching and photolithography on a conductive electrode surface.

8. A multi-domain vertical alignment liquid crystal display of claim 7, wherein the opening area is at least one of the following shapes: rings, circles, round holes, and circular slits.

9. A multi-domain vertical alignment liquid crystal display of claim 8, wherein the diameter of the opening area is not less than approximately 2 μm.

10. A multi-domain vertical alignment liquid crystal display of claim 1, wherein the liquid crystal display further comprises at least one compensation film disposed between a polarizer and one of the first substrate and the second substrate.

11. A multi-domain vertical alignment liquid crystal display of claim 10, wherein the compensation film is a biaxial film which further enlarged the viewing angle of the liquid crystal display (LCD).

* * * * *